No. 620,191. Patented Feb. 28, 1899.
W. SOBEY.
COMBINED CORN AND COTTON PLANTER.
(Application filed Apr. 17, 1897.)
(No Model.) 5 Sheets—Sheet 4.
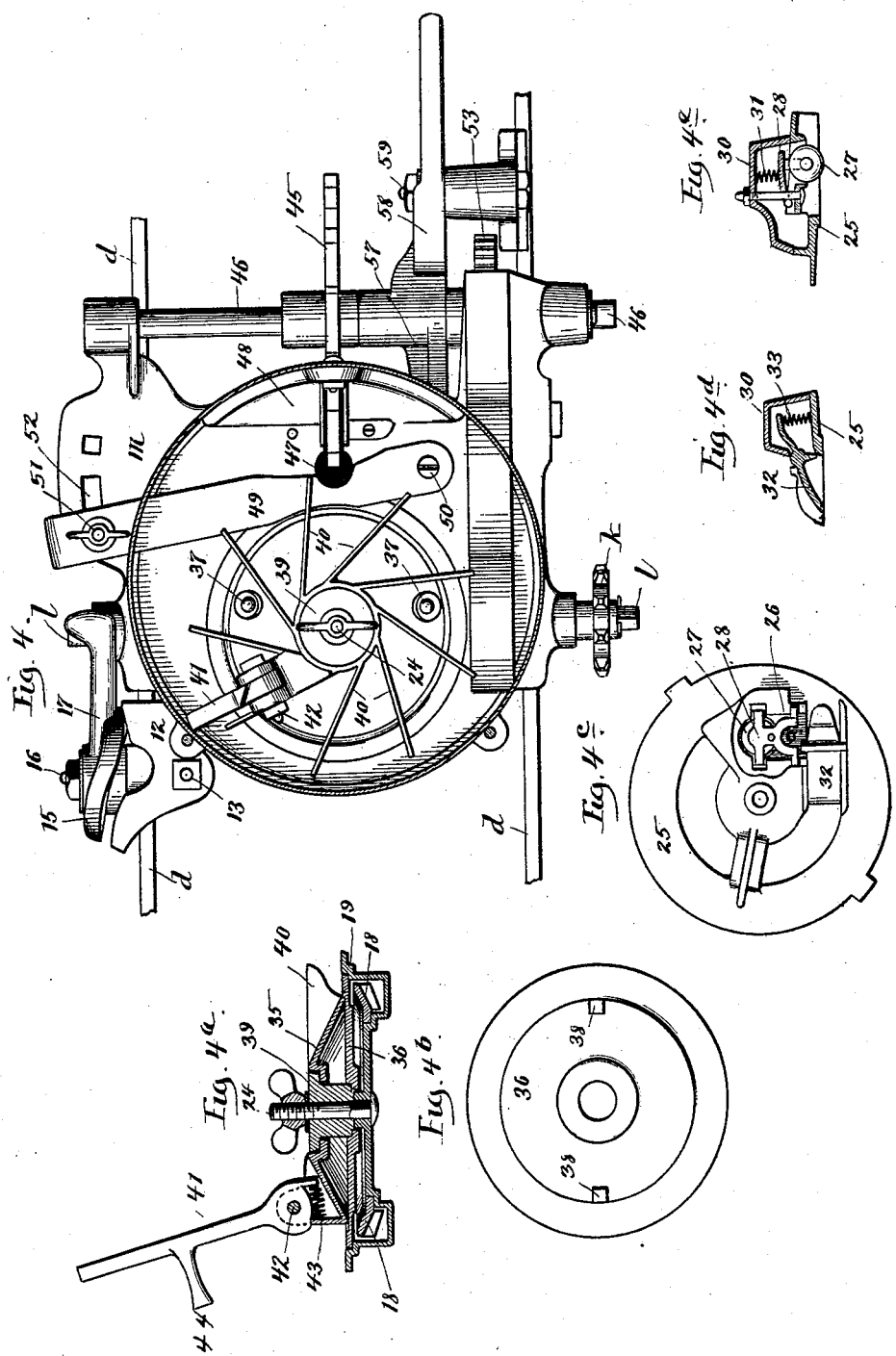

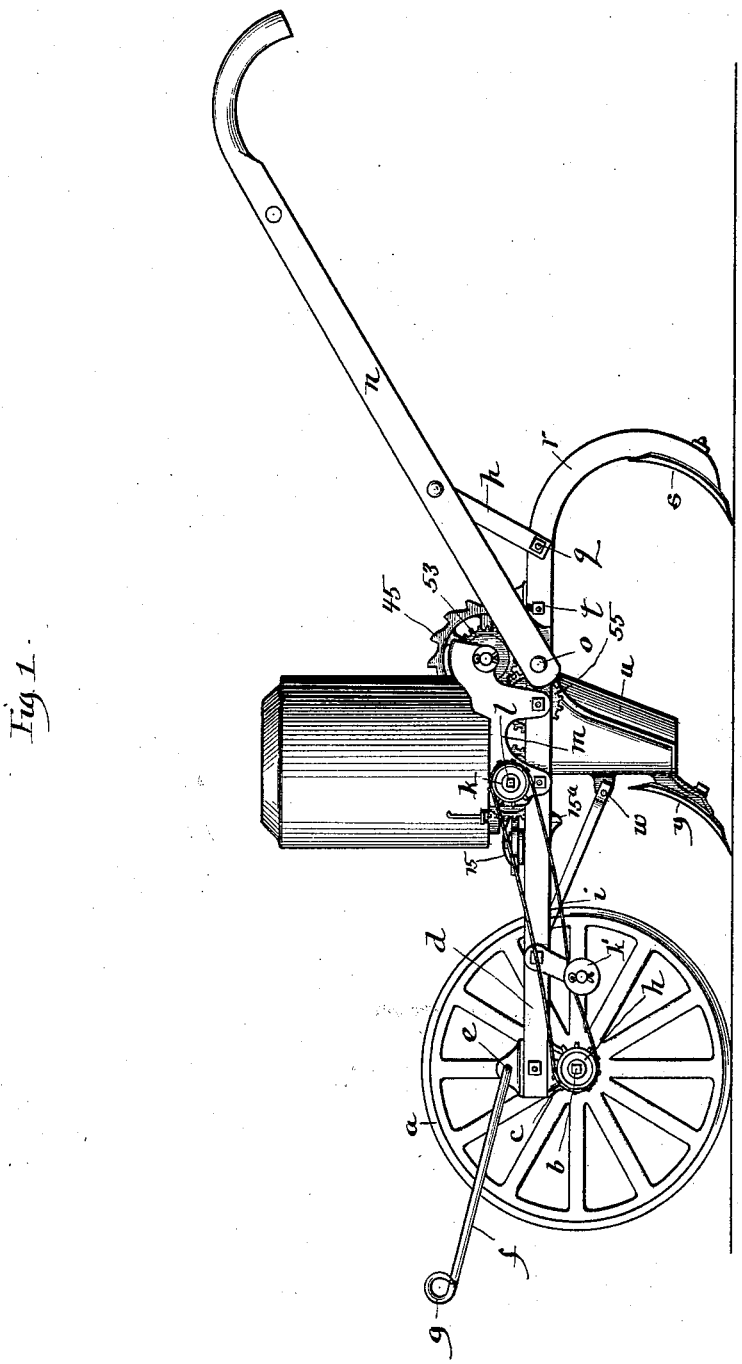

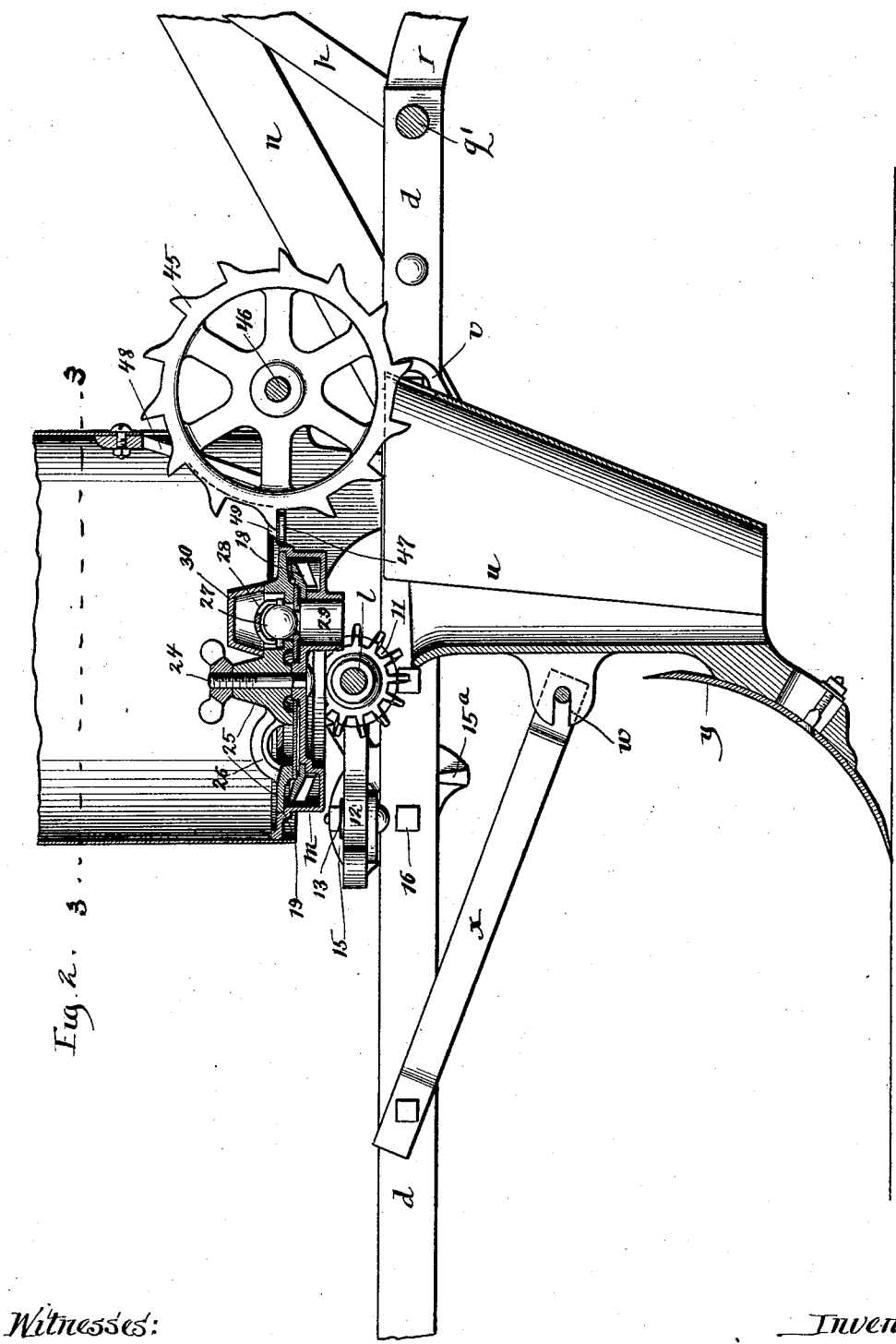

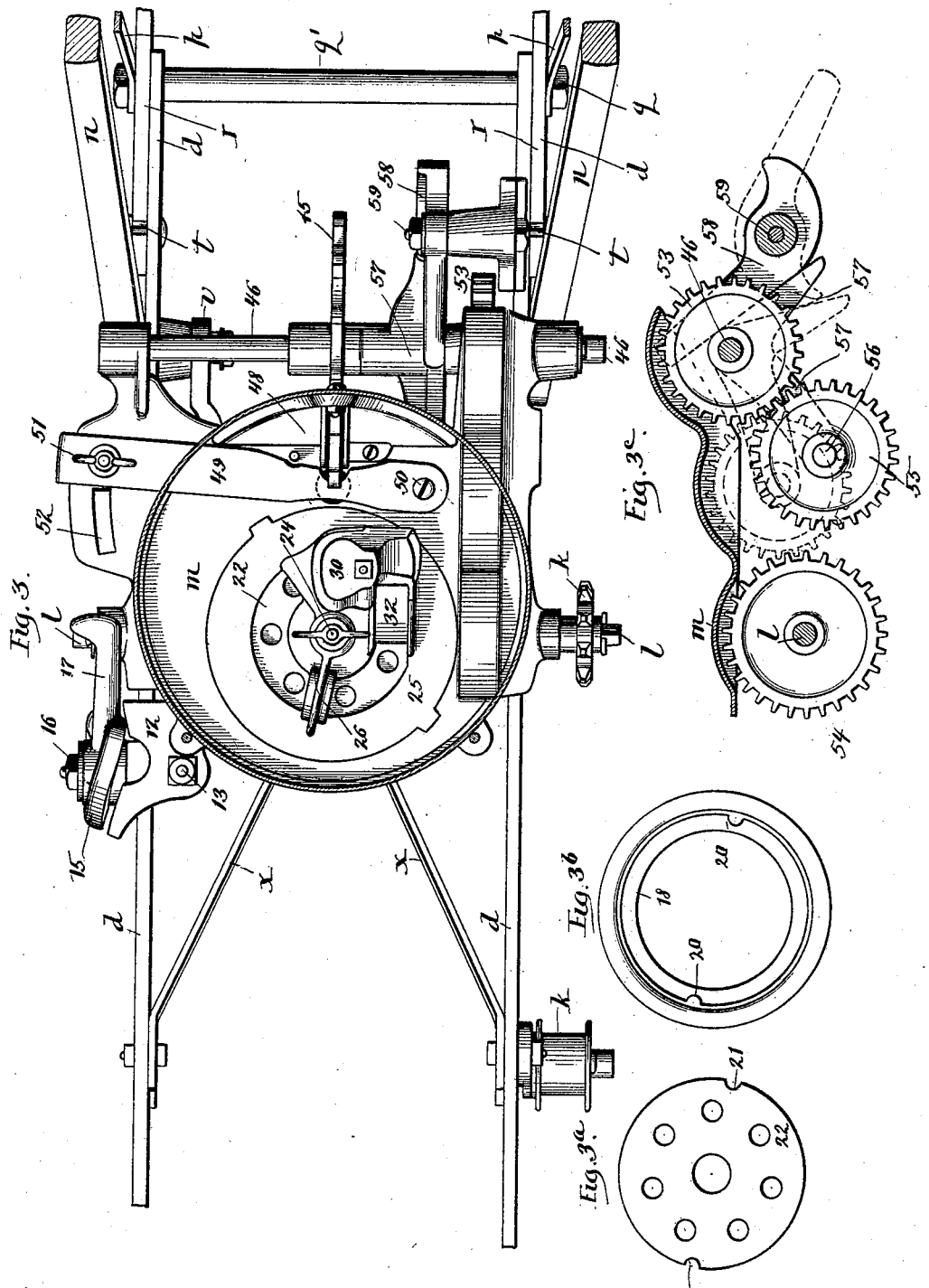

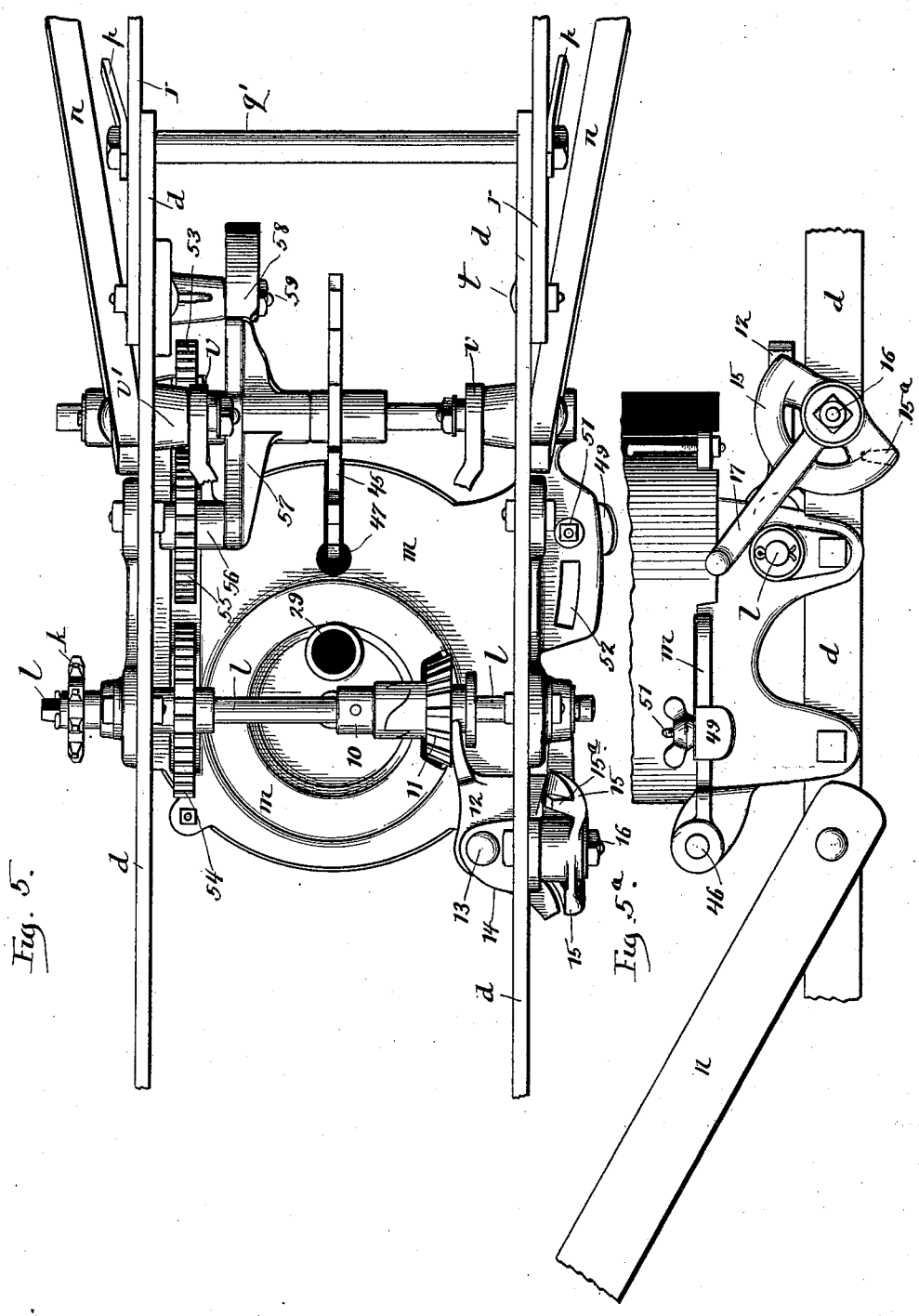

UNITED STATES PATENT OFFICE.

WILLIAM SOBEY, OF RACINE, WISCONSIN, ASSIGNOR TO THE J. I. CASE PLOW WORKS, OF SAME PLACE.

COMBINED CORN AND COTTON PLANTER.

SPECIFICATION forming part of Letters Patent No. 620,191, dated February 28, 1899.

Application filed April 17, 1897. Serial No. 632,600. (No model.)

*To all whom it may concern:*

Be it known that I, WILLIAM SOBEY, of the city and county of Racine, State of Wisconsin, have invented certain new and useful Improvements in a Combined Corn and Cotton Planter, of which I do declare the following to be a full, clear, and exact description.

The invention relates to machines for planting corn or cotton-seed and is of the convertible type, such as may be quickly and readily changed to drop seed of different sort as the operator may require.

The peculiar features of structure, displaying the improvement as applied to a single-wheel walking-planter, will appear in detail from the following description, and be thereafter more clearly pointed out by the claims at its conclusion.

On the drawings like parts bear like designation throughout.

Figure 1 is a side elevation of the improved planter. Fig. 2 is a central vertical section, parts in elevation, at the seed can and spout, displaying the parts employed for dropping corn. Fig. 3 is a plan with the corn-dropper parts in place, the can being in section at line 3 3 of Fig. 2; Fig. 3$^a$, a plan of the corn-dropper disk; Fig. 3$^b$, a plan of the drive-plate to revolve said disk; Fig. 3$^c$, side elevation of the gear-train to control the movement of the feed-wheel for the cotton-seed drop; Fig. 4, a plan similar to Fig. 3, but with the cotton-seed-dropper parts arranged in position instead; Fig. 4$^a$, a detail central section at the drive-plate with the agitator-disk for the cotton-seed drop mounted thereon; Fig. 4$^b$, an under side view of the bottom part of said agitator-disk; Fig. 4$^c$, a plan of the guard-plate over the dropper-disk, the lid of the ball-knocker pocket being removed to expose the keeper for the ball and the seed cut-off; Fig. 4$^d$, a longitudinal section through the cut-off; Fig. 4$^e$, a like section at the ball-knocker with the lid in place. Fig. 5 is a plan of the machine turned bottom face up with the spout removed; Fig. 5$^a$, an enlarged elevation on the right-hand side of the machine at the can-bracket.

In central position at the front of the machine is the ground-wheel $a$, the axle $b$ of which is journaled in elongated cross-bearings of the hangers $c$. Opposite hangers are fitted to side bars $d$ and afford pivot-seats $e$ for draft-yoke $f$, projected forward and terminating in hitch-hook $g$.

On its left end (by preference) the wheel-axle $b$ rigidly carries a sprocket-pinion $h$, over which runs the chain $i$, engaging at rear with a companion sprocket $k$, fixed upon the outer terminal of shaft $l$. An idler $k'$, adjustably sustained from side bar $d$, determines the tension of chain $i$. Shaft $l$ is the main drive-axle for the seeding mechanism and is journaled at opposite seats in brackets of a base-plate $m$, fastened to side bars $d$.

Handles $n$, Fig. 1, bolted at $o$ to side bars $d$, extend backward and by dependent braces $p$ are united with cross-tie $q$ and its spreader-sleeve $q'$, Fig. 3, at the rear ends of side bars $d$. This provision trusses the handles and side bars stoutly together.

At opposite sides the spreader $q$ affords a pivot-mount for standards $r$ of the companion covering-shovels $s$. By slot-and-bolt or like slip joint $t$ the front ends of the standards are held at the side bars. If the shovels $s$ meet with unusual obstruction, the joint $t$ releases, and the standards $r$ are free to turn about spreader-pivot $q$ in avoidance of breakage.

Seed-spout $u$ is pivotally sustained by its ears $v$, Figs. 2 and 5, from side bars $d$, and by slot-and-bolt joint $w$, Fig. 2, is ordinarily held upright through the medium of forked piece $x$, extending to the front and secured at side bars $d$. The shovel $y$ on lower end of the spout acts to open the furrow, as usual. If it encounters any serious obstacle, slip-joint $w$ thereupon releases, and the spout swings to the rear about its ears $v$.

Main axle $l$ extends across the machine just beneath can-bottom $m$ and by clutch-section 10, pinned thereto, Fig. 5, engages at will with companion clutch on end of bevel-pinion 11. At its opposite end said pinion 11 has a collar to receive the forked end of a shifter 12, pivoted, as at 13, to a lug 14, bolted on side bar $d$. A trip 15, pivoted, as at 16, on the adjacent side bar $d$, carries a cam-face thereon which encounters at will the front or rear heel of said shifter 12.

When the parts are in the position shown, the handle 17 of the trip, Figs. 2, 3, and 5ª, rests against the box-boss for the journal-axle *l* as a stop, and in such relation the cam-face of trip 15 thrusts against the rear heel of shifter 12 to keep the pinion 11 interlocked with shaft *l*. By throwing handle 17 forward the cam-face of trip 15 impinges upon the front heel of shifter 12 to unclutch the pinion 11 from the main drive-shaft. A stop 15ª on the inner face of said trip 15 then encounters the rear heel of shifter 12 to hold the parts in set relation as against the tendency of the trip 15, with its handle 17, to drop by gravity about pivot 16. The cam-face of said trip is thus maintained in its contact with the front heel of shifter 12 and the pinion 11 held "off-clutch" from shaft *l*. On reversal the trip again compels the shifter to throw the pinion into action with its drive-shaft.

Through a slot in can-bottom *m* the pinion 11 extends to engage with the rim-teeth on the under face of drive-plate 18, Figs. 2 and 4ª. Said drive-plate is common to both the corn-dropper and the cotton-seeding uses of the machine. In the one instance the plate controls the dropper-disk and in the other actuates the agitator for conveying the seed to the feed-wheel.

Drive-plate 18 is a simple ring resting on a recessed ledge 19 at a circular seat in the upper face of can-bottom *m*. When employed for planting corn, the dropper-disk 22, Figs. 2, 3, and 3ª, snugly rests upon drive-plate 18 and at indents 21 interlocks with opposite lugs 20 of the drive-plate, so as to rotate in unison therewith.

Disk 22 has the usual cells or holes arranged in circular series and by central perforation turns about a guide-boss protected above the adjacent plane face of can-bottom *m*, Fig. 2. A square hole in said boss receives the counterpart upright bolt 24, having thumb-nut thereon to engage the hub of an upper guard-plate 25. Guard 25 is in skeleton form, consisting of a ring-rim seated flush with a ledge on can-bottom *m* and by opposite lugs interlocked with corresponding indents of said bottom. Thumb-nut on bolt 24 holds the guard immovably to its seat.

A cross-bar 26 (approximately diametric) unites opposite points in the rim of skeleton guard 25 and affords a pocket for the ball-knocker 27, Fig. 2, held by its side pintles and by keeper 28 directly above the outlet-hole 29 in can-bottom *m*.

Keeper 28 at its free end carries dependent fingers to bear upon the pintles of knocker 27 and at the rear has side lugs to journal on half-boxes formed in cross-bar 26 and in a removable lid or cover 30, inclosing the knocker and its adjuncts. A coil-spring 31, seated between lid 30 and keeper 28, compels the keeper at its free end to hold knocker 27 by its side pintles yieldingly against seeder-disk 22, and thus in the path of the seed traveling in the cells of such disk. The knocker acts to dislodge the seed and compel it to drop through hole 29 into spout *u*.

Cut-off 32, pivoted on guard-ring 25, has a coil-spring 33 to bear against its tail, and thereby to lightly depress the front or free end of the cut-off into the channel above traveling disk 22. The cut-off keeps back the excess seed, but allows the kernels to pass which are in the cells of disk 22. These find exit eventually at port 29 through the can-bottom.

When the machine is employed to plant cotton-seed, the corn-dropper mechanism just described is taken off and in its place an agitator-disk is mounted within the can above drive-plate 18. For convenience the agitator-disk consists of upper and lower sections 35 36, Fig. 4ª, riveted together, as at 37, Fig. 4, and constituting a light hollow piece to be driven by motor-plate 18. The lower section 36 seats at its rim upon can-bottom *m* and at its under face carries opposite lugs 38, Fig. 4ᵇ, to engage with companion lugs 20 of drive-plate 18, Fig. 3ᵇ. A separate hub 39 centers upon the upright bolt 24 and sockets in ledges at the upper and lower sections 35 36 of the agitator-disk. The lower face of hub 39 abuts against the raised boss on can-bottom *m*, and thus is stopped from any tight contact at its sockets in sections 35 36. The agitator-disk is left free to revolve without excessive friction. On its top face the upper section 35 of said disk carries a series of tangential wings 40 and at its rim is furnished with a finger 41, pivoted thereon, as at 42, and by force of spring 43 compelled to traverse in near relation to the can-wall. This finger 41, with its detent 44, adapts itself in circuit to reach and pull apart any matted seed and because of spring 43 commands the full diameter of the can although the finger is revolving eccentrically to the can-axis.

Sweeping through the can-bottom on the rear side and at about the mid-line of the machine is the feed-wheel 45, mounted upon counter-shaft 46. A series of detents on rim of wheel 45 move in turn past hole 47, Fig. 4, in can-bottom *m* to encounter the seed as the same is presented at such point by action of the tangential wings, the finger 41 and sloping face of the upper section 35 pertaining to the agitator-disk. An inclined fender 48, fastened to the can, aids in directing the seed toward hole 47, and as well prevents its escape through feed-wheel 45.

Gage-plate 49, pivoted, as at 50, to the can-bottom, extends past hole 47 and a slit in the can. Its outer free end carries set-screw 51, by which the gage can be adjusted and held in place at assigned position along the slot 52, Figs. 3 and 4, in lateral extension of can-bottom *m*. When the machine is dropping corn, gage-bar 49 is adjusted at extreme location, Fig. 3, so as to cover the extra port 47 and prevent waste. Hole 47 is in use only when cotton or like seed is being planted by aid of the agitator-disk and feed-wheel 45. Shaft 46 for said feed-wheel journals in opposite bosses on can-bottom $m$, and near one side the shaft rigidly carries rear pinion 53 of a gear-train connected up with the main axle $l$. The front gear-pinion 54 is fastened to said drive-axle $l$ and meshes with an intermediate pinion 55, which engages in turn with rear pinion 53. Said intermediate gear 55 is an idler and journals upon a stud 56 at the front end of an arm 57, loosely sleeved upon counter-shaft 46. By gravity the idler-pinion 55 drops down and stands "off-gear," (see Fig. 3$^c$,) its rim then resting against a convenient stop—e. g., the pivot-boss $v'$ for one of the spout-ears $v$, Fig. 5. A cam-lock 58, which swings upon a stud 59, directly at the rear of idler-carrier 57, Fig. 3$^c$, on manipulation of its handle is made to encounter the tail of said carrier or arm 57. Thereupon the arm 57 turns upward and the idler 55 is brought into mesh with the companion gear of the train. In such relation of the parts the handle of cam-lock 58 assumes the position shown by dotted lines, Fig. 3$^c$, and is held at rest against any further turning by contact of its tip at the rear with spreader $q'$ or like stop. Consequently idler 55 is maintained in interlocked state as a part of the gear-train. Hence counter-shaft 46 rotates feed-wheel 45 in unison with the movement of main axle $l$ and of the agitator-disk. By disconnecting idler 55 it is plain that feed-wheel 45 remains at a standstill, as desired, when the machine is to be used for dropping corn. Aside from the replacement of the dropper-disk by the agitator-disk, or vice versa, the simple shift of the idler 55 into or out of gear and the control of extra seed-port constitute all of the changes requisite in converting the machine from one to another of its uses.

Obviously the details of structure can be varied according to the mechanic's skill without departing from the essentials of the advance.

Having thus described the invention, what I claim as new, and desire to secure by Letters Patent, is—

1. In planters, the combination with the drive-plate for the seeder mechanism and with the rotating shaft therefor, of the intermediate pinion clutched to said shaft and engaging the drive-plate, a rocking shifter to control the pinion-clutch and a vibratory trip having cam-face thereon to coact alternately with the separate heels of said shifter, substantially as described.

2. In planters, the combination with the seeder drive-plate located at the bottom of the seed-can, of the rotating shaft in mesh therewith, the parallel counter-shaft and feed-wheel mounted thereon to thrust the seed portionwise out of the can, a gear-train extended between the two shafts and comprising a pinion upon each of them with intermediate or idler pinion swung by suitable arm or carrier from the counter-shaft, and a cam-lock pivotally hung to engage the tail of said carrier and thereby keep the idler in mesh, substantially as described.

3. In planters, the combination with the seed-can and with the feed-wheel to discharge the seed portionwise therefrom, of the rotary agitator set eccentrically within said can near its bottom and the sweep-arm upon such agitator, said arm being automatically adjustable to contact with the can-wall during rotation, substantially as described.

WILLIAM SOBEY.

Witnesses:
HENRY MITCHELL WALLES,
ROBERT EARL BUSHELL.